July 4, 1950    E. SUTHERLAND    2,514,104
CONVEYER MECHANISM
Filed Nov. 6, 1946
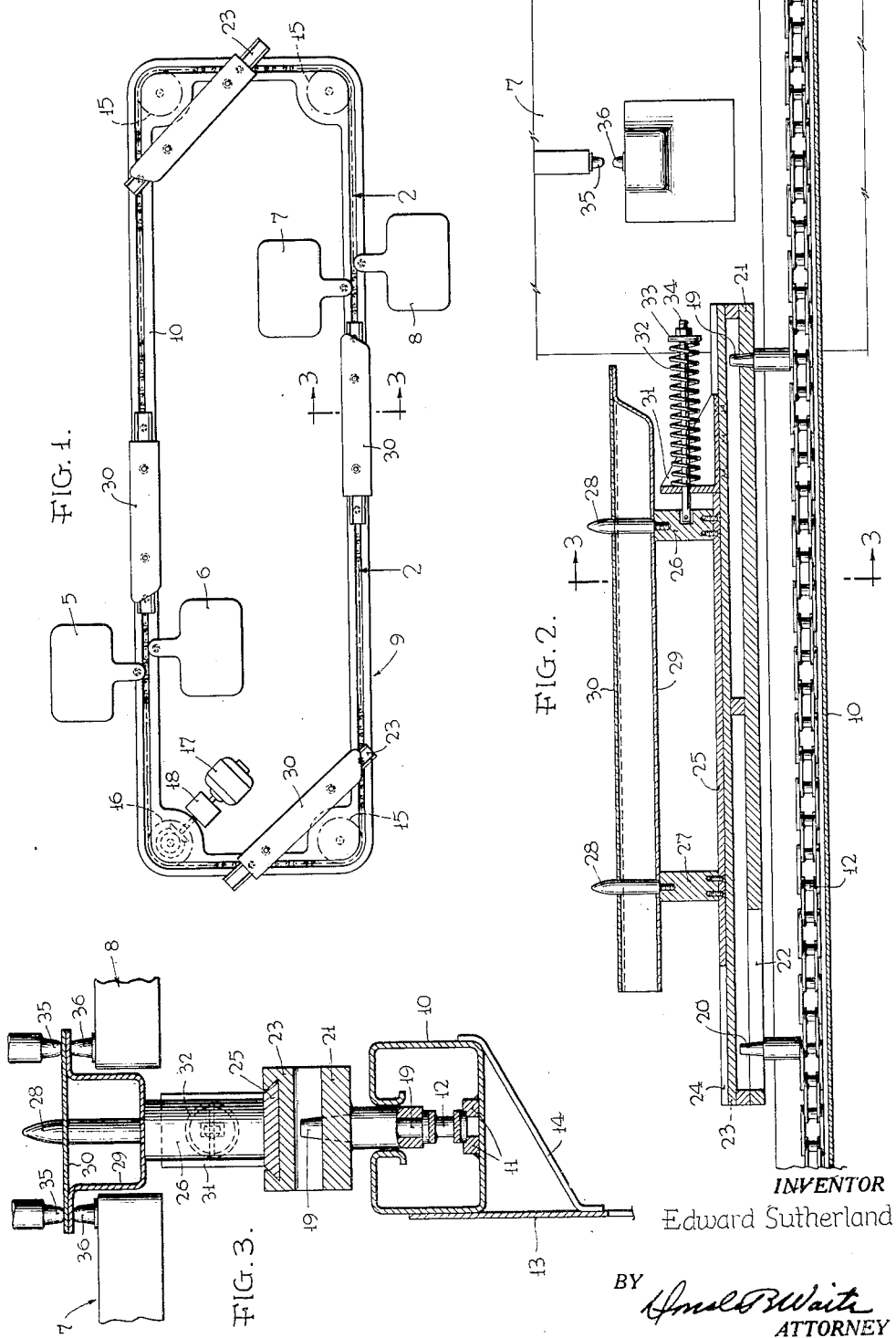
INVENTOR
Edward Sutherland
BY Ansel B. Waite
ATTORNEY Patented July 4, 1950

2,514,104

UNITED STATES PATENT OFFICE 2,514,104

CONVEYER MECHANISM

Edward Sutherland, Haddonfield, N. J., assignor to The Budd Company, Philadelphia, Pa., a corporation of Pennsylvania Application November 6, 1946, Serial No. 708,151

2 Claims. (Cl. 198—19)

1

The invention relates to a device useable in spot-welding or the like and, more particularly, to an automatically operating device of this type. The invention also relates to a spot-welding installation in general.

Among the objects of the invention is the provision of a device or installation including a workpiece support and a machine, such as for instance, a spot-welding machine, for treating a workpiece held by said support, in which the support and the working machine are movable relative to each other so as to bring successive points of the workpiece into operative position with respect to said machine.

A more specific object of the invention is to provide a device of the indicated type which permits continuous automatic operation.

Outstanding among the features of the invention for achieving the aforesaid objects is a continuously movable device, preferably a conveyor, which carries the work support proper, such work support being movable relative to said device in the direction of travel so that during the time in which the machine performs an operation on the workpiece the work support may be held stationary but after the finishing of such operation may move on or even catch up again with the continuously proceeding device until the next operation of the machine begins.

The aforesaid and further objects and features of the invention as well as the advantages thereof are more fully explained and will be more easily understood from the embodiment of the invention illustrated in the attached drawing and described hereinafter.

In the drawing:

Figure 1 is a small-scale plan view of an installation embodying the features of the invention as applied to the spot-welding together of two elongated members;

Figure 2 is, on a larger scale, a fragmentary longitudinal vertical section along line 2 of Figure 1; and Figure 3 is a section substantially along line 3—3 of Figures 1 and 2 on a still larger scale.

Two pairs of electric spot welding machines 5, 6 and 7, 8 are arranged on opposite sides of an endless conveyor structure 9. The conveyor structure includes a channel 10 presenting, in plan view, a rectangular figure and carrying the conveyor proper, in the form of a chain 12, on guiding pieces 11 welded to the channel bottom. The channel 10 is stiffened and supported at appropriate height above floor level by members 13, 14 which are shown only partially in the draw-

2 ing. At the corners of the structure 9 the chain engages wheels or rollers 15 and 16, the latter being driven by a motor 17 over a gear 18 so as to impart continuous motion to the chain 12.

Certain pins 19, 20 of the chain have upward extensions projecting above the structure 9. Each two of these pins engage and carry an elongated plate 21. The pin 19 engages a hole of the plate 21 which has about the same diameter, whereas the pin 20 engages an elongated slot 22 so as to allow relative longtudinal movement and to take into account the shortening of the distance between the pins 19 and 20 when the chain between such two pins rounds one of the corners of the structure 9. Arranged above and firmly connected with the plate 21 is a second plate 23, the latter carrying a longitudinal dovetail recess 24 in which a correspondingly shaped member or plate 25 is slidable.

The plate 25 has two brackets 26, 27 each carrying at its upper end a pin 28 adapted to pass through centering holes of the two members 29, 30 of a workpiece to be spot welded.

The structure 21, 23 may be called a carriage and the structure 25 to 28 may be called a slide. As indicated in Figure 1, there are a plurality of slides and carriages connected with the conveyor. Indeed, the carriages and slides may be arranged in close succession.

The slide 25 normally abuts a bracket 31 firmly connected to plate 23 of the carriage under the action of a spring 32 having one end resting against the bracket and the other end against the end plate 33 of a bolt 34, which latter is connected to bracket 26 of the slide 25.

The arrangement is such that the marginal portions of the workpieces 29, 30 to be welded together are held at the height of the space between the electrodes 35, 36 of the welding machines.

In operation, workpieces 29, 30 are placed on the slides and carriages in advance of one of the pairs of welding machines, and then the device 21 through 34 carries the workpiece past the welding machines with their marginal portions between the welding electrodes. During this passage, the electrodes and the welding current are preferably operated automatically in predetermined time interval. Each time the electrodes grip the workpieces 29, 30, the latter come to a stand-still together with the respective slide 25 while the carriage 21, 24 as well as the chain 12 with the pins 19, 20 move on continuously. During such stand-still of a slide, the spring 32 is compressed but as soon as the electrodes release the work, after the performance of a welding operation, the spring 32 will make the workpiece and the slide 25 catch up with the carriage and conveyor which kept on moving continuously.

Obviously, the two welding machines engaging the two sides of one pair of workpieces should be operated synchronously. These machines may be operated automatically and may be started and stopped by limit switches which are operated when the work and its support enter or leave, respectively, the active region of the welding machines.

The provision of two or more pairs of welding machines greatly increases the capacity of the installation. Besides, it permits the simultaneous production of right- and left-hand workpieces which require different arrangement and adjustment of the welding machines and the supports for the work.

The machine may be provided with means so as to give the work, if necessary, a transverse movement relative to the welding machine while it passes the latter. However, such means are not illustrated, as they are well known in the art.

One person usually will be sufficient for removing the finished workpieces from the carriages after they pass one pair of welding machines and for re-loading such carriages with unfinished workpieces. In the arrangement illustrated in Figure 1, this means that the machine would require two persons who might also supervise the proper operation and maintenance of the automatic welding machines.

The invention is liable to many modifications. Obviously, specific means permitting the stoppage of the workpieces and the resumption of their travel with the continuously moving transporting means can be carried out in many ways different from those illustrated and described. Likewise, the invention is not restricted to the combination with or use for electric spot-welding machines but may be used also for other machines, such as for instance riveting, screw driving, or drilling machines. On the other hand, the more specific features of the illustrated and described embodiment are believed to be particularly simple, durable, and effective, and it is also believed that the invention is especially applicable to spot welding.

Coverage is sought for the general principles and for the more specific features of the invention as expressed by the spirit and the language of the attached claims.

What is claimed is:

1. Workpiece support comprising a carriage adapted for positive connection and movement with a conveyor in one direction, a work-engaging member carried by said carriage slidingly in the same direction, resilient means between said member and said carriage permitting said member to stand still for a brief period while the carriage may move on and for moving said member forwardly after such stand-still to its position on the carriage before such stand-still.

2. In a device for moving a workpiece past a machine adapted for performing a working operation on the workpiece: an endless conveyor movable in one direction past the machine; means for continuously driving the conveyor; a carriage in substantially positive engagement with the conveyor, a slide carried by said carriage movably in the direction of travel of and relative to said carriage, means on said slide for positively engaging a workpiece, and resilient means between said slide and said carriage permitting said slide to stop during the performance of a working operation while the carriage moves on, which means are adapted for forwardly moving said slide so that it resumes its normal position relative to said carriage.

EDWARD SUTHERLAND.

REFERENCES CITED

The following references are of record in the file of this patent:

UNITED STATES PATENTS

| Number | Name | Date |
|---|---|---|
| 2,163,930 | Beiderman | June 20, 1939 |
| 2,227,145 | Lex et al. | Dec. 31, 1940 |
| 2,314,154 | McCoy | Mar. 16, 1942 |